United States Patent [19]

Di Lullo Arias et al.

[11] Patent Number: 5,529,125
[45] Date of Patent: Jun. 25, 1996

[54] ACID TREATMENT METHOD FOR SILICEOUS FORMATIONS

[75] Inventors: Gino F. Di Lullo Arias; Atikah J. Ahmad, both of Singapore, Singapore

[73] Assignee: B. J. Services Company, Houston, Tex.

[21] Appl. No.: 367,487

[22] Filed: Dec. 30, 1994

[51] Int. Cl.$^6$ .................................................. E21B 43/27
[52] U.S. Cl. ........................ 166/307; 507/237; 507/923; 507/933
[58] Field of Search .................................. 166/307, 308; 507/237, 923, 933

[56] References Cited

U.S. PATENT DOCUMENTS

| | | | |
|---|---|---|---|
| 2,885,004 | 5/1959 | Perry | 166/307 |
| 3,828,854 | 8/1974 | Templeton et al. | 166/307 |
| 3,868,996 | 3/1975 | Lybarger et al. | 166/250 |
| 3,889,753 | 6/1975 | Richardson | 166/307 |
| 3,948,324 | 4/1976 | Lybarger | 166/307 |
| 3,953,340 | 4/1976 | Templeton et al. | 166/307 X |
| 4,089,787 | 5/1978 | Lybarger et al. | 166/307 X |
| 4,090,563 | 5/1978 | Lybarger et al. | 166/307 |
| 4,561,503 | 12/1985 | Wong | 166/307 |
| 4,599,182 | 7/1986 | Young et al. | 166/307 X |
| 4,703,803 | 11/1987 | Blumer | 166/300 |
| 4,770,796 | 9/1988 | Jacobs | 166/307 X |
| 4,807,703 | 2/1989 | Jennings, Jr. | 166/307 |
| 5,063,997 | 11/1991 | Pachla et al. | 166/307 X |
| 5,307,875 | 5/1994 | Jennings, Jr. | 166/282 |
| 5,336,316 | 8/1994 | Dawson et al. | 106/724 |

FOREIGN PATENT DOCUMENTS 1103008  6/1981  Canada .

*Primary Examiner*—George A. Suchfield
*Attorney, Agent, or Firm*—Arnold, White & Durkee

[57] ABSTRACT

A method of stimulating production in sandstone formations of oil and gas wells is achieved by using an acid system which slowly dissolves the silicate and clay formations of the sandstone to increase its permeability. The acid system uses phosphonate compounds, including phosphonate acids and the salts and esters thereof, in combination with hydrofluoric acid. The hydrofluoric acid may be provided by hydrolyzing ammonium bifluoride or hydrofluoric acid itself. The phosphonate compounds of the acid systems retard the rate at which the hydrofluoric acid reacts with the clays while enhancing the reaction rate with silica, which comprises the bulk of sandstone formations. This allows more penetration of the formation immediately adjacent to the wellbore. The phosphonate materials also improve the dispersion and suspension properties of the treating solution with silts and fines and improves the complexing capacity of the acids with silicate and alumni complexes.

42 Claims, 7 Drawing Sheets

ACID TREATMENT METHOD FOR SILICEOUS FORMATIONS

BACKGROUND OF THE INVENTION

1. Field of the Inventions

This invention relates to a method of treating siliceous formations to increase the permeability of the formations.

2. Description of the Prior Arts

Subterranean sandstone or siliceous formations in oil and gas wells have been treated in the past with acid treatments to increase their permeability thus increasing or improving production from the formation. As used herein the term "siliceous" refers to the characteristic of having silica and/or silicate. Most sandstone formations are composed of over 70% sand quartz particles, i.e. silica ($SiO_2$), bonded together by various amounts of cementing material including carbonate (calcite or $CaCO_3$) and silicates. The acid treatment of siliceous formations should be distinguished from the acid treatment of carbonate formations. Carbonate formations can be treated with a variety of acid systems, including hydrochloric, acetic and formic acids, with usually equal success. The treatment of siliceous formations with these acids, however, has little or no effect because they do not react appreciably with the silica and silicates which characterizes the sandstone formations.

By far the most common method of treating sandstone formations involves introducing hydrofluoric acid into the wellbore and allowing the hydrofluoric acid to react with the surrounding formation. Hydrofluoric acid is preferred almost uniformly because of its reactivity with silica and silicates. The silicates include such things as clays and feldspars. Hydrofluoric acid tends to react very quickly with authigenic clays, such as smectite, kaolinite, illite and chlorite, especially at temperatures above 150° F. Because of this, the hydrofluoric acid penetrates only a few inches of the formation before it is spent. Simultaneously, precipitation of various alumni and/or silicate complexes occur as a result of the reaction of the hydrofluoric acid with the clays and silts. The precipitation products plug pore spaces and reduce the porosity and permeability of the formation, thus impairing flow potential. Because clays are normally a part of the cementitious material that holds the sandgrains of sandstone formations together, the dissolution of clay also weakens and unconsolidates the sandstone matrix in the vicinity of the wellbore, thus causing damage to the formation. The damaging effects due to both the unconsolidation of the matrix and the precipitation of complexes which clog the pore spaces of the formation can eliminate or even revert the stimulation effect of the acid treatment.

One of the most common prior art methods of reducing the reaction rate of hydrofluoric acid with the area of the formation immediately surrounding the wellbore, is accomplished by the slow hydrolysis of ammonium bifluoride to convert it to hydrofluoric acid, either at the surface or within the well. While this method allows the acid to penetrate slightly further into the formation, it does not eliminate precipitates from forming and clogging the matrix. Other methods such as retarding the acid reaction by introducing an oil wetting surfactant into the well to prevent and reduce contact of the acid with the formation have also been used with limited success. Oil wetting surfactants create problems of their own which inhibit the production of oil and gas from the formation.

What is therefore needed is a method of treating siliceous or sandstone formations using hydrofluoric acid which reduces the amount of precipitates produced and which inhibits the reactivity of the hydrofluoric acid with the clay or silicate elements of the formation.

SUMMARY OF THE INVENTION

A method of treating siliceous formations which reduces the amount of precipitates produced and which inhibits the reactivity of the hydrofluoric acid with clay or silicate elements of the formation is achieved by preparing a treatment solution containing a phosphonate compound and a source of hydrofluoric acid. The formation is then contacted with the solution so that siliceous materials of the formation are dissolved.

DETAILED DESCRIPTION OF THE PREFERRED EMBODIMENT

The precipitation of silicates when acidizing siliceous formations is difficult to efficiently prevent due to the multicomponent nature of the deposits formed. In order to overcome the shortcomings of the hydrofluoric acid systems which are commonly employed today, various materials were evaluated based upon their ability to complex with aluminum and silicate compounds in acidic environments. Of the materials evaluated, the phosphonate materials used in the prevention and inhibition of silicate scale were selected for use with hydrofluoric acid systems. Specifically, these acid systems included conventional hydrochloric/hydrofluoric acid systems and organic/hydrofluoric acid systems which include formic/hydrofluoric acid mixtures. Unless otherwise indicated, all concentrations or compositions are based on weight percent.

The phosphonate materials used for acid treatment of sandstone formations include the phosphonic acids and the salts and esters of the phosphonic acids. The general formula for such phosphonate materials is given as follows Where R1, R2 and R3 may be hydrogen, alkyl, aryl, phosphonates, phosphates, acyl, amine, hydroxy and carboxyl groups, and R4 and R5 may consist of hydrogen, sodium, potassium, ammonium or an organic radical. Examples of these materials include aminotri (methylene phosphonic acid) and its pentasodium salt, 1-hydroxyethylidene-1,1-diphosphonic acid and its tetrasodium salt, hexamethylenediaminetetra (methylene phosphonic acid) and its hexapotassium salt, and diethylenetriaminepenta (methylene phosphonic acid) and its hexasodium salt.

Among the phosphonate materials evaluated, emphasis was concentrated on aminotri (methylene phosphonic acid), herein referred to as "HZ acid," available in 50% strength as "DEQUEST 2000" from Monsanto Co.; 1-hydroxyethylidene-1,1-diphosphonic acid, herein referred to as "HV acid," available in 60% strength as "DEQUEST 2010" from Monsanto Co.; and diethylene triamine penta (methylene phosphonic acid), herein referred to as "HY acid," available in 50% strength as "DEQUEST 2060" from Monsanto Co. Table 1 shows the inhibition of calcium and magnesium silicate scale buildup using these different phosphonate compounds and mixtures thereof.

TABLE 1

| INHIBITOR 100 PPM | 24 HOURS @ 50° C. INHIBITION |
| --- | --- |
| HZ Acid | N/A |
| HV Acid | 22 |
| HY Acid | 12.2 |
| HV + HY (1:1) | 14.2 |

The phosphonate materials were also evaluated because of their potential for retarding the acid reaction with clays and their ability to slowly hydrolyze ammonium bifluoride or ammonium fluoride to produce hydrofluoric acid. By titrating various phosphonate acids with tetra methyl ammonium chloride, the acidity constants of the different acids was determined. These are set forth in Table 2.

TABLE 2

| ACID | N° ACIDITY CONSTANTS | $pK_1$ | $pK_2$ | $pK_3$ | $pK_4$ | $pK_5$ |
| --- | --- | --- | --- | --- | --- | --- |
| HY | 10 | <2.0 | <2.0 | <2.8 | 4.5 | <5.5 |
| HZ | 6 | <2.0 | <2.0 | <4.3 | <5.4 | <6.7 |
| HV | 5 | <1.0 | <2.5 | <7.0 | <11.4 | — |

It is known that under downhole conditions, the acid's pH remains between 1 and 3. This implies that not all of the hydrogen ions ($H^+$) are used so that their utilization is dependent on the spending of the solution. From Table 2, it can be seen that the HY acid should produce the slowest hydrolysis rate. These materials are hydrolytically and thermally stable, with some materials being stable up to temperatures as high 400° F.

Overall, the HY, HV, and HZ acids are weak acids, however when evaluated for the first and second hydrogen (i.e. $pK_1$ $pK_2$) they behave as moderately strong acids. Table 3 shows a comparison of the phosphonate acids used to standard mineral and organic acids used in oil field related treatments.

TABLE 3

| ACID | $pK_1$ (STRONGEST HYDROGEN) |
| --- | --- |
| HYDROCHLORIC ACID | <1 |
| HV ACID | <1 |
| HY ACID | <2 |
| CITRIC ACID | <3.1 |
| HYDROFLUORIC ACID | <3.5 |
| FORMIC ACID | <3.8 |
| ACETIC ACID | <4.8 |
| BORIC ACID | <8.7 |

A pK value below 2 is regarded as a strong acid, while a pK value between 2 and 3 is regarded as a moderately strong acid, a pK value of between 4 and 7 is a weak acid, and a pK value above 7 is characterized as a very weak acid.

In order to evaluate the effect of phosphonates on the solubility of quartz and clays, several mixtures of the phosphonate acids were prepared using ammonium bifluoride as the source of hydrofluoric acid. The phosphonate acid mixtures were then tested along with standard hydrofluoric acid systems and other commercially available retarded acid systems using static and dynamic solubility tests. The commercially available retarded acid systems used consisted of "CLAY ACID", "RMS ACID" and "RHF ACID". "CLAY ACID" is a fluoroboric acid solution available from Dowell Schlumberger. "RMS ACID" is available from BJ Services and consists primarily of a hydrochloric acid and hexafluorophosphoric acid mixture. The "RHF ACID" is a retarded hydrofluoric acid system consisting of 12% hydrochloric acid and 3% hydrofluoric acid using ammonium bifluoride as the source of hydrofluoric acid and an aluminum salt as a retarder. "RHF ACID" is available from Halliburton Company.

Figure 1:
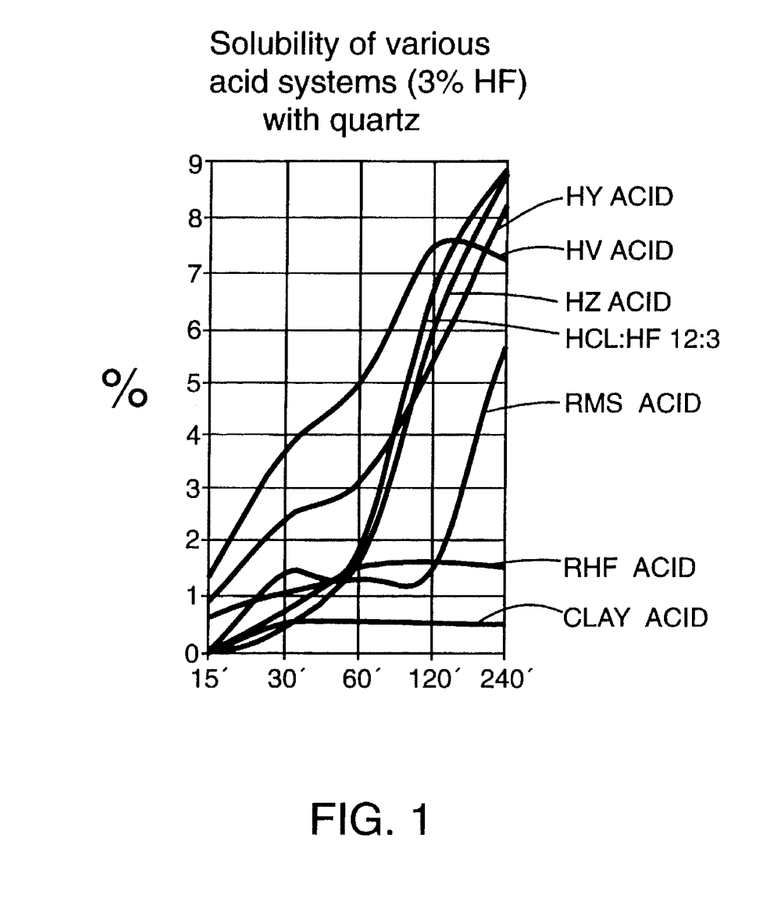
FIG. 1 is a graphical representation of the solubility of quartz with various acid systems over time.
Figure 2:
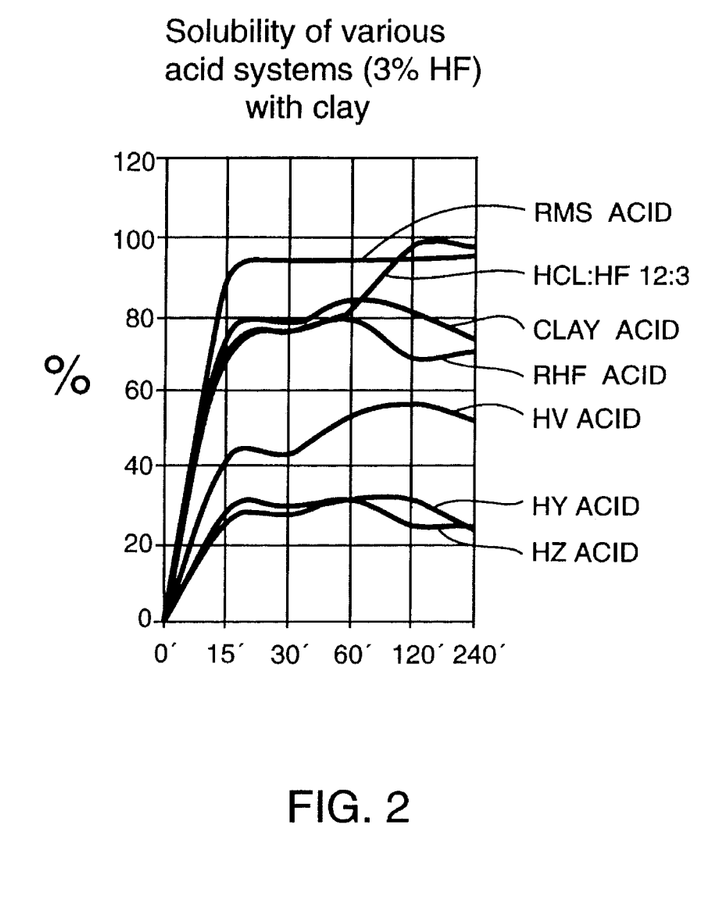
FIG. 2 is a graphical representation of solubility of clays with various acid systems.
Figure 3:
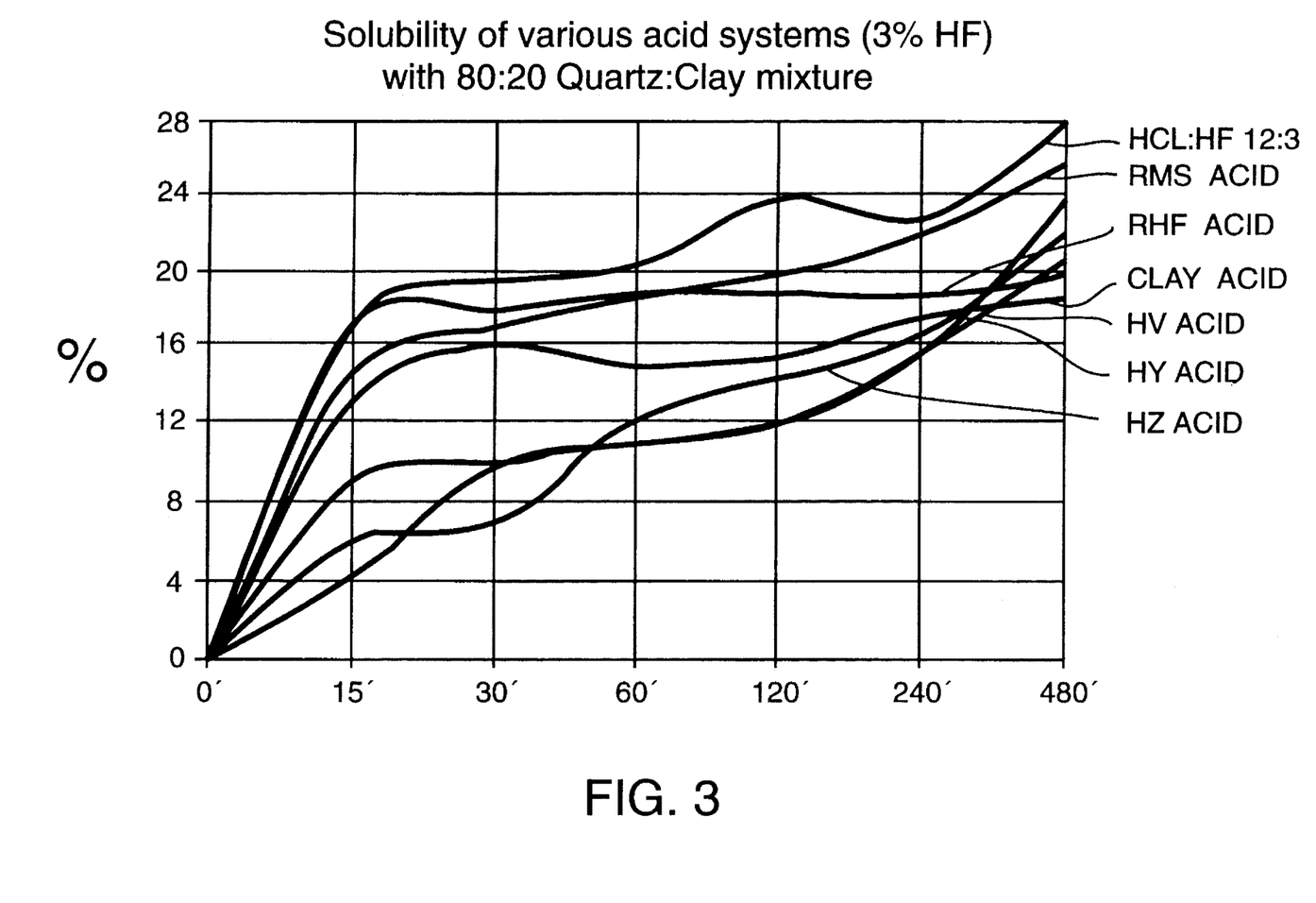
FIG. 3 is a graphical representation of the solubility of an 80:20 Quartz:Clay mixture in a variety of acid systems.

To simulate quartz, 20–40 mesh sand was used instead of formation quartz, and bentonite and kaolin clay were used to simulate formation clays. Tests were also conducted using a mixture of sand and clay in an 80:20 ratio to simulate a typical sandstone formation. All the solubility tests were performed at 180° F. which appeared to be the critical temperature to effectively retard acid reaction rate with clays. For FIGS. 1–3, the concentration of the HY acid was 3% by volume of the total solution (4.1% by weight). For HV acid the concentration was 3% by volume (3.0% by weight). For HZ acid the concentration was 3% by volume (3.1% by weight). The results of these solubility tests are presented in FIGS. 1–3. The initial reaction rates with quartz for the HY and HV acid, as shown in FIG. 1, are much higher than that of standard hydrofluoric acid. From FIG. 2, it can be seen that the phosphonate acids retard the reaction rate with clays during the initial 15 minutes. After this initial 15 minute period, the clay's solubility is limited as shown by the flattened portion of the curve of FIG. 2. FIG. 3 shows the same trends with a much lower solubility at all times for the three phosphonate acids used compared to the other acid systems.

Figure 4:
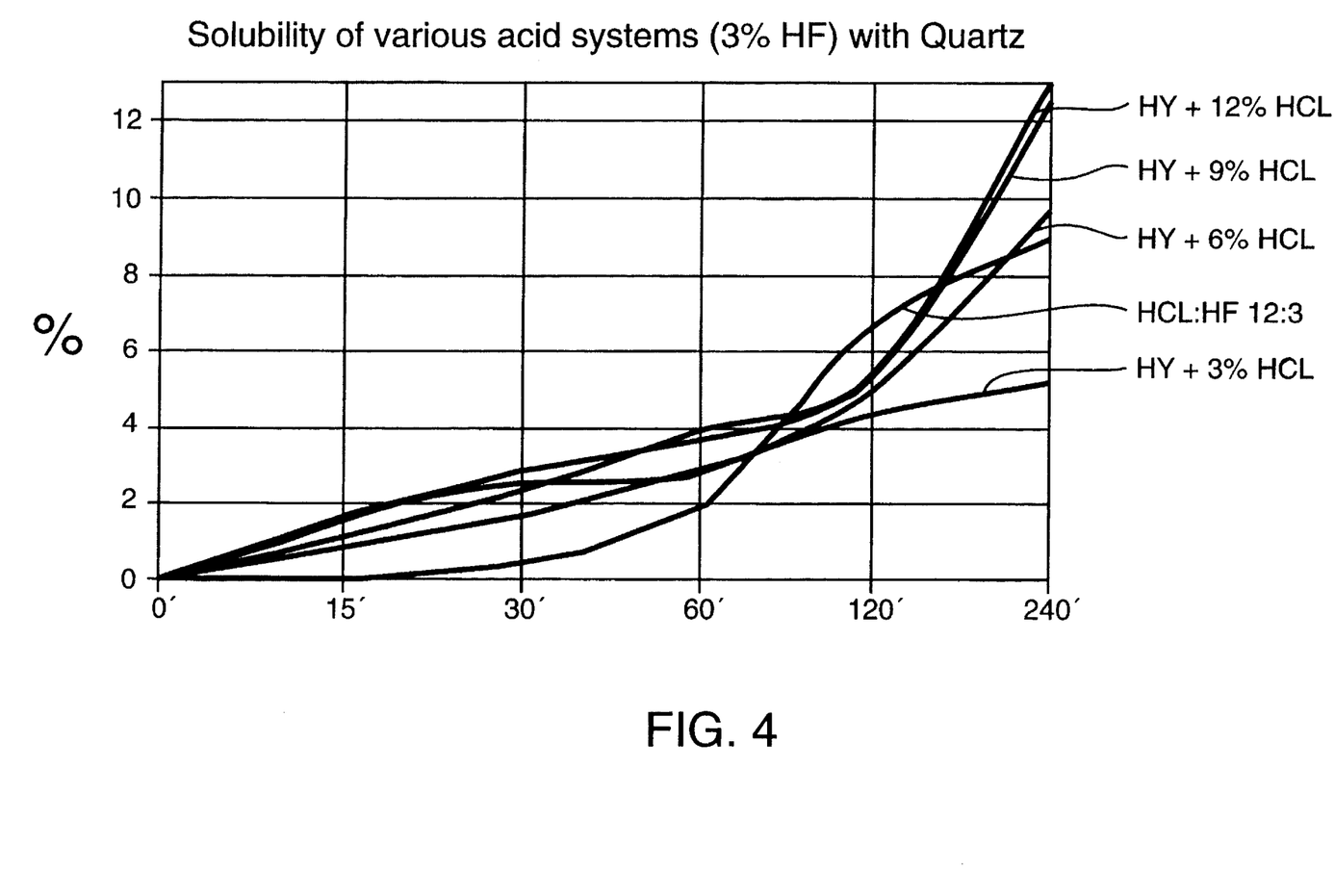
FIG. 4 is a graphical representation of the solubility of quartz with various acid systems containing varying amounts of hydrochloric acid.
Figure 5:
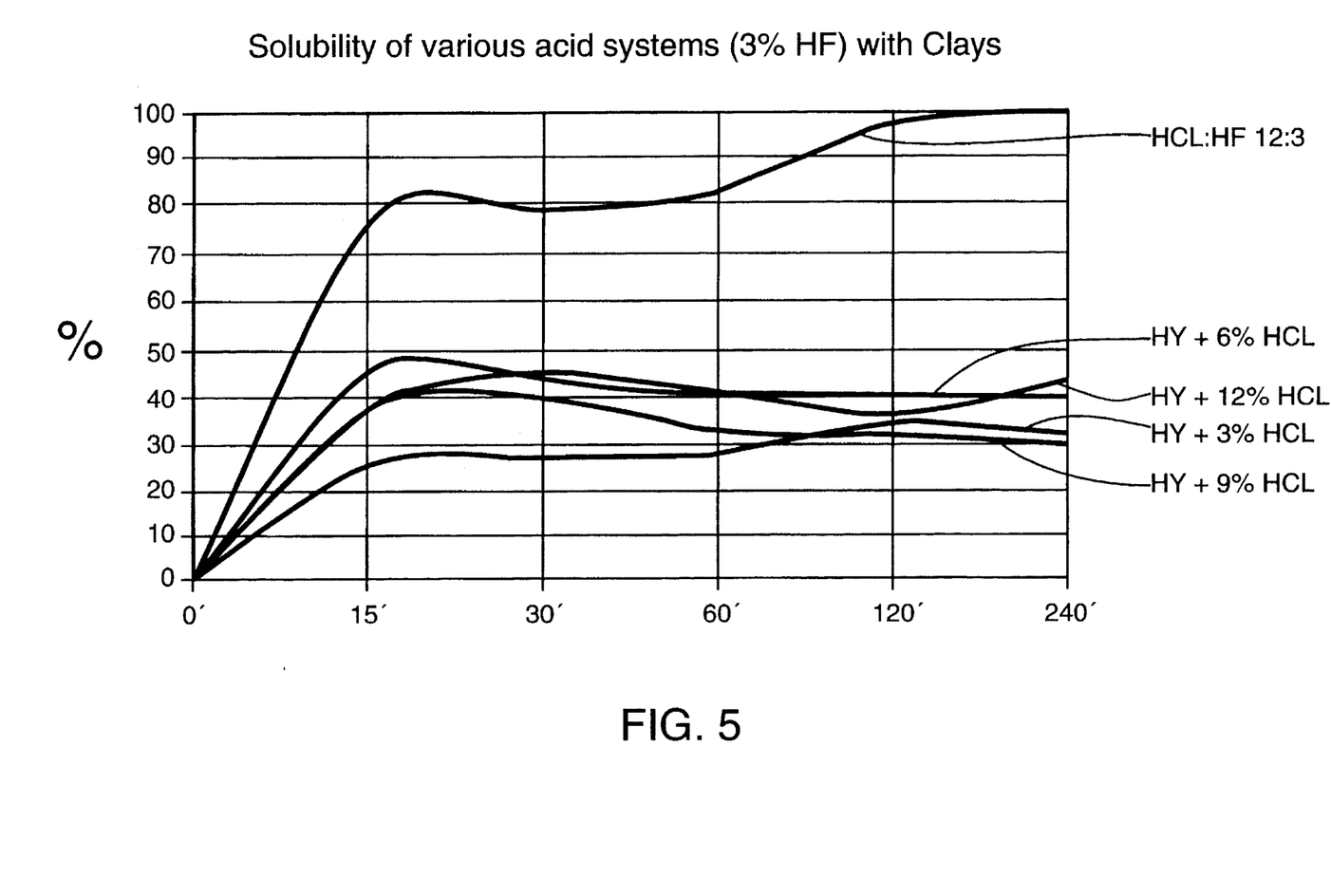
FIG. 5 is a graphical representation of the solubility of clays with various acid systems with varying amounts of hydrochloric acid.
Figure 6:
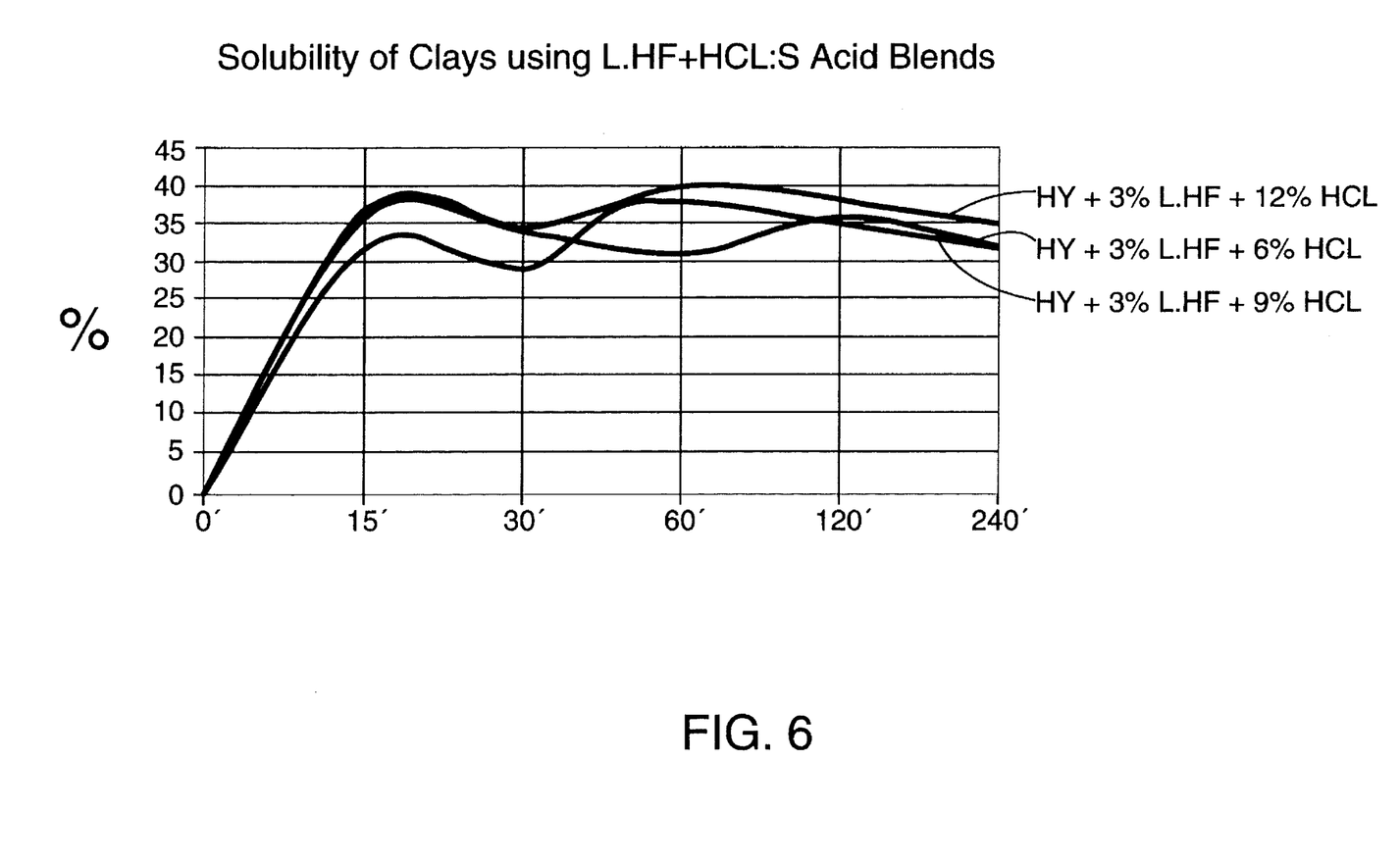
FIG. 6 is a graphical representation of the solubility of clays using a phosphonate acid with liquid hydrofluoric acid and hydrochloric acid in varying concentrations.

Normally, during matrix acidizing of sandstone formations, extra hydrochloric acid is used to prepare the hydrofluoric acid solutions. Keeping the pH low during the treatment prevents precipitation of fluorides, i.e. Ca, Mg, etc. . . . , and favors precipitation of the more soluble fluorosilicates. To determine how the phosphonate acid/hydrofluoric acid systems work using various concentrations of hydrochloric acid, tests were conducted to determine the reaction rate of these acids with quartz and clays. The results are presented in FIGS. 4 and 5. The concentration of the HY acid was 3% by volume of the total solution (3.8–4.1% by weight). As shown in FIG. 4, when the hydrochloric acid concentration increases, the reaction rate and the solubility of quartz increases. However, with clays, as seen in FIG. 5, only in the first 15 minutes did the solubility increase proportionately to the hydrochloric acid strength. The solubility then stabilized with low amplitude oscillations similar to those of FIG. 2 without using hydrochloric acid. As shown in FIG. 6, the same results were obtained using liquid hydrofluoric acid instead of ammonium bifluoride. The concentration of the HY acid used was 3% by volume (3.8–4.0% by weight) of the total solution.

As a result of these tests, it was concluded that the main mechanism for retarding the reaction rate and limiting the solubility of clays was either physical and/or chemical adsorption. Phosphonates adsorb to the rock disregarding the electrostatic charge of the rock surface. Up to ten gallons of the phosphonate acids can be adsorbed and fully coated on one cubic meter of rock. Physical adsorption depends mainly on the surface area of the rock. Therefore, in a sandstone formation, phosphonate will adsorb preferentially to the clays. Table 4 gives some idea of the relative surface area of various mineral materials. As can be seen, clays have a much higher surface area, therefore more of the phosphonates will adsorb to the clay materials.

Similar solubility results were obtained when presoaking the clays in either hydrochloric acid and 0.6% HY acid by volume (0.8% by weight of solution) or plain 1% HY acid by volume (1.4% by weight) and then treating the clays with conventional hydrofluoric acid systems. This procedure is not recommended by itself, however, for two reasons. First, it cannot be guaranteed that the preflush and the main acid will flow through the same channels within the formation. Second, the system looses some of the suspending and dispersing properties provided by the phosphonate in the acid systems.

Figure 8:
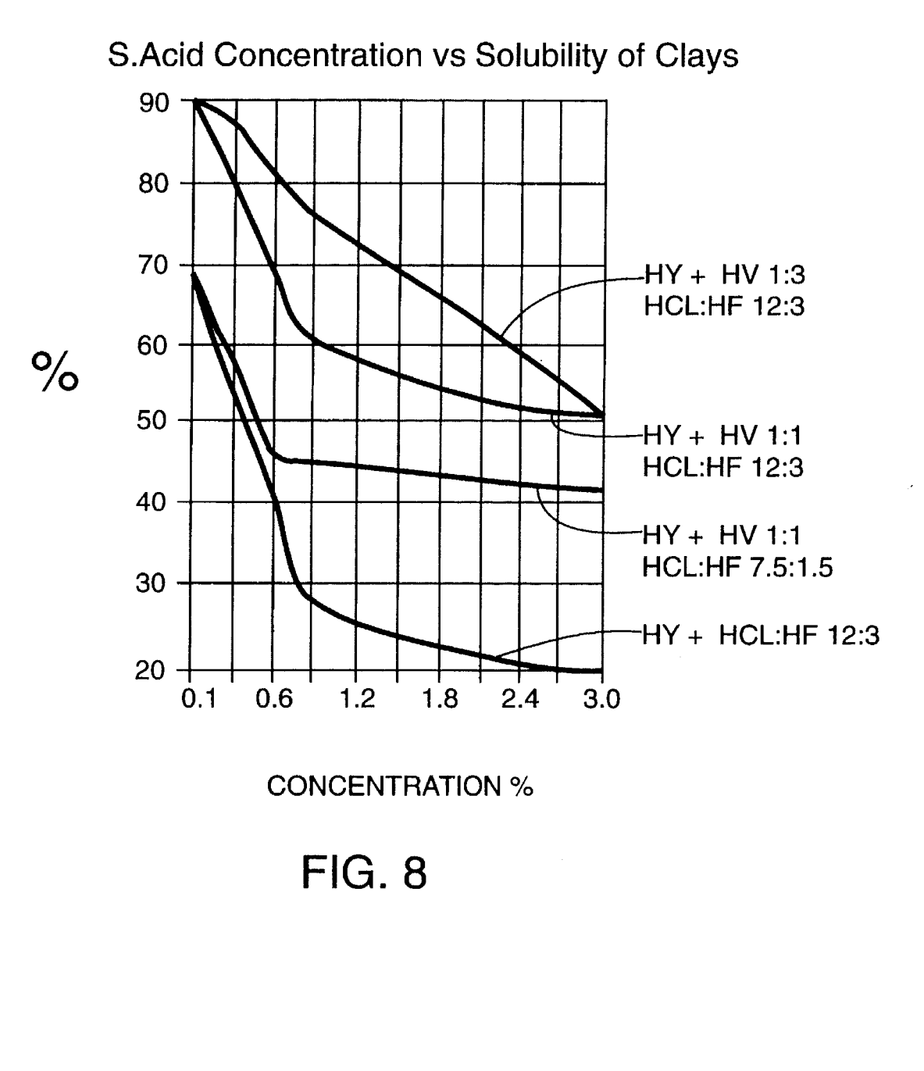
FIG. 8 is a graphical representation of the solubility of clays in relation to different acid concentrations of various acid systems.

Dynamic solubility tests were performed to determine the optimum concentration of each phosphonate acid system. The results are shown in FIG. 8. It can be seen from FIG. 8, that to achieve a 50% reduction in solubility, concentrations between 0.25 to 0.6% HY acid by volume of the total solution (0.3%–0.8% by weight) are required, without regard to the hydrochloric acid concentration and the source of the hydrofluoric acid used. Moreover, the concentration of the phosphonate is directly proportional to the concentration of hydrofluoric acid to obtain the same solubility performance. In other words, for a 50% solubility of clay using 3% hydrofluoric acid by weight, around 0.6% by volume (0.8% by weight) of the HY acid is required ( i.e. 12 gals/1000 gals

TABLE 4

| Material | Formula | Charge @ pH <1 | Surface Area |
|---|---|---|---|
| Sand | $SiO_2$ | + | 183 sq. cm/g |
| Silica Flour | $SiO_2$ | + | 3770 sq. cm/g |
| Montmorillonite | $Al_4(OH)_4Si_8O_{20}$ | − | 750 sq. m/g |
| Kaolinite | $Al_4(OH)_8Si_4O_{10}$ | + | 22 sq. m/g |
| Feldspar | $Kal\ Si_3\ O_8$ | + | 29 sq. m/g |
| Illite | $KAl_2(AlSiO_3O_{10})(OH)_2$ | −+ | 113 sq. m/g |
| Chlorite | $(Fe,Mg)_5Al_2(AlSiO_3O_{10})(OH)_8$ | −+ | 29 sq. m/g |
| Oligoclase | 90% $NaAlSi_3O_8$ + 10% $CaAlSi_2O_8$ | + | 29 sq. m/g |

Figure 7:
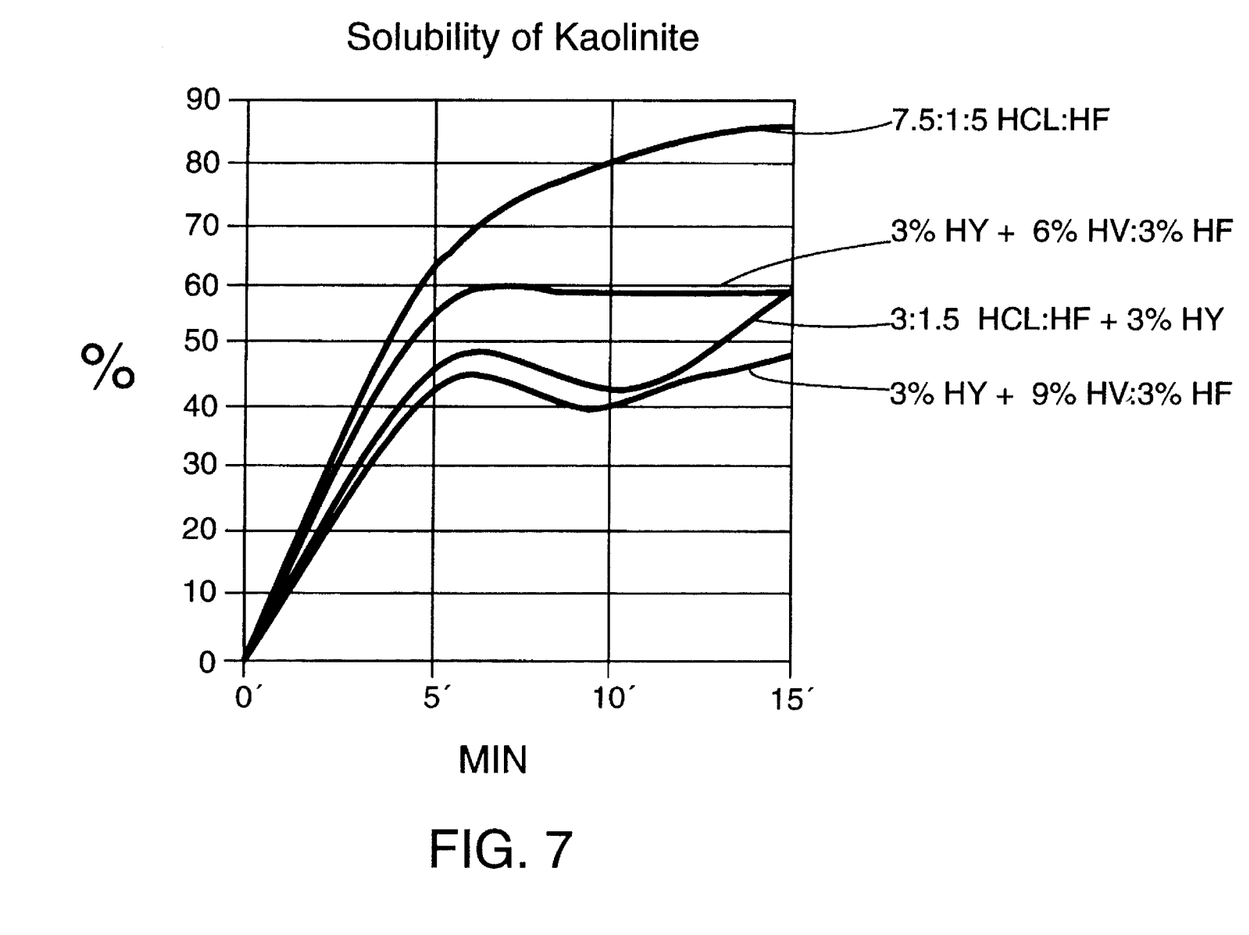
FIG. 7 is a graphical representation of the solubility of kaolinite using various acid systems.

Besides physical adsorption, chemical adsorption is also possible with clays or silts that have a higher content of calcium, iron or aluminum. Because reactivity increases proportionately to the surface area/volume ratios, solubility tests were performed using kaolinite instead of bentonite. The objective was to verify if phosphonates could adsorb faster than the acid could dissolve the clays. These test results are presented in FIG. 7 which show lower reaction rates and solubility for the phosphonate/hydrofluoric acid mixtures. Two more tests were also conducted using carbonate chips instead of kaolinite with equivalent results, indicating that retardation and solubility limitations are possible even with fast dissolving minerals. The slow reaction rate with carbonates is very important because calcium ions readily form insoluble precipitates with silicates and fluorides.

of a 50% strength HY acid). For 1.5% hydrofluoric acid by weight, only 0.3% HY acid by volume (0.4% by weight) is required.

Slightly higher concentrations are required when HZ acid is used and even higher concentrations when HV acids or mixtures thereof are used. Depending on the concentration of the HY acid, the HY acid could limit smectite or equivalent size clay solubility to a range within 20 to 70%. This is shown by the curve using only HY acid in combination with hydrochloric and hydrofluoric acid. However, to achieve equivalent solubility limitations with finer clays, such as kaolinite, higher concentrations are required. Table 5 shows the solubility of kaolinite after 10 minutes using various concentrations of HY acid and hydrochloric/hydrofluoric acid mixtures.

TABLE 5*

| | 10 MINUTES SOLUBILITY % | | | | | | |
|---|---|---|---|---|---|---|---|
| Acid | 0 | HY 4 GPT | HY 8 GPT | HY 12 GPT | HY 24 GPT | HY 40 GPT | HY 60 GPT |
| 7.5:1.5 HCl:HF | 82 | 66 | 64 | 63 | 61 | 55 | 49 |
| 12:3 HCl:HF | 96 | 89 | 88 | 87 | 86 | 85 | 54 |

*GPT indicates gal/1000 gals using 50% strength HY acid.

Because these tests do not exactly replicate matrix solubility in formation cores where there is much less material available for surface reaction, it was concluded that considering the mix of clays in the formation, between 0.3 to 4.5% by volume of HY acid (0.4%–5.8% by weight) is all that is required. However, if the amount of small clays is higher than 10%, HY acid can be added to a hydrochloric acid preflush as well.

The prior art methods of using cationic surfactants to retard the acid reaction rate oftentimes results in damage to the formation. This is due to the surfactant's oil wetting properties which are hard to revert, thus affecting future production rates of oil and gas from the well. It was found that clay samples which were treated with a hydrochloric/hydrofluoric and HY acid mixture agglomerated in toluene while they dispersed readily in methanol. This indicated that the phosphonate acid mixtures made a water wet surface for the clay formations so that the production of oil and gas would not be detrimentally affected.

Another major benefit of the phosphonates used in the acid systems is their ability to deflocculate and disperse colloidal particles. Phosphonates are able to suspend these particles over extended periods of time. This is due to their negative charge and surface adsorption. Kaolin clay slurries are completely deflocculated by phosphonates.

Phosphonates also keep large amounts of scalant in solution at very low concentrations. This phenomenon is known as "threshold effect." This threshold inhibition caused by the 4) A visual examination was conducted and pH was determined for each acid mixture.

5) An additional equivalent concentration of 1000 pounds $Na_2CO_3$ per 1000 gallons of available acid was added to each mixture and allowed to react.

6) The procedure of step 4 was repeated.

7) The precipitate and undissolved solids were then filtered, washed with distilled water, dried and weighed.

The results of these tests are presented in Table 6. As can be seen, no precipitate was formed when using the HY and HV acids without hydrochloric acid. When using HY and HV acid in this way, a minimum amount of 1% HY acid by volume (1.4% by weight) must be used, with the amount of HV acid being 2 or 3 times the amount of HY acid used. For example, a suitable formulation would be 2% by volume (2.6% by weight) HY acid+6% by volume (7.8% by weight) HV acid+3% by weight hydrofluoric acid. In the examples of Table 6, the concentration of HY acid was 3% by volume (3.8–3.9% by weight). The concentrations of HV and HZ acid were 9% and 9% by volume (13.5% and 10.9% by weight), respectively.

TABLE 6

|  | Clay Acid | RHF ACID | 12:3 HCl:HF | 3% HY + 3% HF + 9% HCl | 3% HY + 3HF + 9% HV | 3% HY + 3HF + 9% HZ |
|---|---|---|---|---|---|---|
| Step 1 |  |  |  |  |  |  |
| pH | 0.5 | 0.5 | 1.1 | 1.9 | 2.6 | 2.6 |
| ppt | NONE | NONE | NONE | NONE | NONE | YES |
| Step 3 |  |  |  |  |  |  |
| pH | 5.0 | 0.9 | 1.4 | 2.2 | 4.4 | N/A |
| ppt | YES | NONE | CLOUDY | NONE | NONE | N/A |
| Step 5 |  |  |  |  |  |  |
| pH | 7.8 | 7.4 | 2.1 | 3.5 | 7.6 | N/A |
| ppt | YES | YES | YES | YES | NONE | N/A | phosphonates depends on conditions such as the type of scalant, fluid composition, saturation level, temperature, pH and the type of phosphonate used. Brine tests were conducted to evaluate the possible formation of precipitates under acidizing conditions found in the oil field. To conduct these tests, various brines were prepared using 2% KCl, 2% NaCl, 2% $CaCl_2$ and 2% $MgCl_2$ by weight in distilled water. A reaction test was then conducted with various acids using the following procedure.

1) Each acid mixture was placed into a plastic container and mixed with an equal volume of the above-described brine.

2) A visual examination was conducted and pH was determined on each sample after 1 hour at 75° F.

3) An equivalent concentration of $Na_2CO_3$ (1000 pounds per 1000 gallons of available acid) was added to each acid mixture and allowed to react.

Because the above test did not include aluminum or silicates, which are substances reclaimed from clay and quartz dissolution processes, the following tests were performed to evaluate solubility and precipitate inhibition of various acid systems. A brine was prepared with 100 ppm Ca, 100 ppm $HCO_3$, 40 ppm Mg and 40 ppm Al in tap water. A reaction was then conducted with various acids using the following procedure.

1) Each acid mixture was placed in a plastic container mixed with an equal volume of the above described brine (50 ml+50 ml) and stirred for 5 minutes.

2) A visual examination was conducted.

3) One ml of sodium silicate solution (2900 ppm of SiO2) was added in gradual steps after an elapsed time of one hour.

The results of these tests are presented in Table 7. From these results it can be seen that under a low pH environment, the phosphonates do inhibit the precipitation of silicates.

TABLE 7*

| ACID SYSTEM | 1 ML S. SILICATE SOLUTION | 2 ML S. SILICATE SOLUTION | 3 ML S. SILICATE SOLUTION |
|---|---|---|---|
| 12:3 HCL:HF | NO PRECIPITATE | NO PRECIPITATE | PRECIPITATE |

TABLE 7*-continued

| ACID SYSTEM | 1 ML S. SILICATE SOLUTION | 2 ML S. SILICATE SOLUTION | 3 ML S. SILICATE SOLUTION |
|---|---|---|---|
| 12:3 HCL:HF + 12 GPT HY | NO PRECIPITATE | NO PRECIPITATE | SLIGHTLY CLOUDY |
| RHF ACID | SLIGHT PRECIPITATE | PRECIPITATE | PRECIPITATE |
| CLAY ACID | SLIGHTLY CLOUDY | PRECIPITATE | PRECIPITATE |
| RMS ACID | PRECIPITATE | PRECIPITATE | PRECIPITATE |

*GPT indicates gal/1000 gals using 50% strength HY acid.

When using the phosphonate compounds in sandstone acidizing, the source of hydrofluoric acid could be either liquid hydrofluoric acid, ammonium bifluoride or ammonium fluoride. When ammonium bifluoride or ammonium fluoride are used as a source of hydrofluoric acid, enough acid should be present to completely hydrolyze the ammonium bifluoride or ammonium fluoride. For example, for a 3% by weight hydrofluoric acid solution prepared by hydrolyzing ammonium bifluoride, 3% by volume (3.8% by weight) HY acid+9% by volume (13.5% by weight) HV acid with no hydrochloric acid should be used.

The concentration of phosphonates or their mixtures should be kept just to the optimum point as established by solubility tests, such as those performed and shown in FIG. 8. From FIG. 8, the optimum point would be just to the left of the point where the curve begins to level out. Additional phosphonate beyond this amount could jeopardize the threshold effect discussed previously, with possible precipitation of insoluble salts. The threshold effect is unpredictable and may be caused by one or a combination of the phosphonate concentration, concentration in excess of 40,000 ppm Ca ions, increases in concentrations of other cations, and by neutralization or increase of the pH of the solution.

Phosphonates are strongly anionic materials with each $RPO_3H_2$ linkage inhibiting precipitation of up to 10,000 molecules of scalant. Their affinity with alkaline metal is very strong so that Ca, Na and $NH_4$ ions complex with the phosphonate leaving very little to form as precipitates with fluorides or fluorosilicates at the initial stages of the acid's reaction. Although the use of ammonium bifluoride is preferred in prior art acidizing treatments, ammonium bifluoride adds cations that combine with the phosphonates, inhibiting to a minor extent the beneficial effect of the phosphonate material in complexing with the formation ions. Therefore, liquid hydrofluoric acid is preferably used in forming the acidizing solutions.

Because the phosphonate acid systems of the invention do not react completely with clays, swelling of smectite may be a potential problem. Therefore, all phosphonate acid mixtures discussed were checked for compatibility with clay stabilizing agents, such as dimethyldiallyl ammonium chloride and polymethyldiallyl ammonium chloride. The use of clay stabilizing agents is only important when smectite is present in the formation. Preferably the clay stabilizers are added as a preflush and with the main acid. Suitable clay stabilizing agents are available from BJ Services, Inc., and marketed under the name "CLAYTROL". During tests conducted, concentrations of the clay stabilizing agent were used from 1–5 gallons per thousand gallons of treatment solution with no visual deterioration or detrimental performance with regard to the precipitation, clay swelling and acid retardation. The test procedure was as follows. Ten grams of bentonite were soaked for 5 minutes at room temperature in 40 ml of various acid solutions. The clays were then filtered and dropped in 30 ml of water. Initial and final clay volumes were visually measured. The results are presented in Table 8.

TABLE 8*

| TREATING FLUID | CLAYTROL INTERNATIONAL | VOLUME CHANGE |
|---|---|---|
| WATER | 0 | 2.5 |
| WATER | 2 | 1.8 |
| 12:3 HCL:HF | 0 | 0.6 |
| 12:3 HCL:HF | 2 | 0.3 |
| 12:3 HCl:HF + 12 GPT HY | 0 | 0.8 |
| 12:3 HCl:HF + 12 GPT HY | 2 | 0.3 |

*GPT indicates gal/1000 gals using 50% strength HY acid.

The phosphonate acids were also tested with iron sequestering agents to see if there were any compatibility problems. Specifically, citric acid, nitrilotriacetic acid (NTA), ethylenediaminetetraacetic acid (EDTA), acetic acid, lactic acid, isoascorbic acid and their ammonium salts were used as the iron control additives with no observed compatibility problems. When treating formations, the concentration of the iron sequestering agent should be enough to sequester 3000 ppm iron, preferably as both a pre-flush and with the main acid. Without the iron sequestering agent, impermanent permeability of the formation may result due to iron phosphonate precipitates.

The acids of the invention were also tested with different corrosion inhibitors. Although some corrosion inhibitors produced small amounts of sludge due to their cationic charge, the corrosion inhibitor "CI-9" available from BJ Services, Inc., produced adequate protection without sludge formation. After several additives and various mixtures were tried to boost inhibition performance, a mixture of 75% of CI-9 and 25% HZ acid by volume, herein referred to as "CI-9/HZ" was found to produce the best results. Corrision inhibition of the CI-9/HZ is shown in Table 9 using various acid systems. The results are not surprising due to the fact that phosphonates are normally used to boost metal protection in various corrosion inhibitor formulations.

TABLE 9*

| ACID SYSTEM | TEMP °F. | CI-9/HZ GPT | PROTECTION TIME (HR.) | Weight Lost (LB./sq ft) |
|---|---|---|---|---|
| 15% HCl | 180 | 2 | 8 | 0.028 |
| 28% HCl | 180 | 3 | 6 | 0.085 |

TABLE 9*-continued

| ACID SYSTEM | TEMP °F. | Cl-9/HZ GPT | PROTECTION TIME (HR.) | Weight Lost (LB./sq ft) |
|---|---|---|---|---|
| 12:3 HCl:HF | 180 | 5 | 16 | 0.055 |
| 7.5:1.5 HCl:HF + 6 GPT HY | 180 | 3 | 16 | 0.048 |
| 12:3 HCl:HF + 12 GPT HY | 140 | 3 | 16 | 0.030 |
| 12:3 HCl:HF + 12 GPT HY | 160 | 4 | 16 | 0.047 |
| 12:3 HCl:HF + 12 GPT HY | 180 | 6 | 16 | 0.040 |

*GPT indicates gal/1000 gals using 50% strength HY acid.

Compatibility and emulsion tests were performed with the phosphonate materials with diesel, light oils and heavy crude. The de-emulsifiers "NE-10", "NE-32" and "NE-18", available from BJ Services, Inc., produced good results. In addition other formulations were checked for compatibility with ethylene glycol monobutyl ether, "INFLO-100", "S-400" and "PARAVAN", also available from BJ Services, Inc., without any problems. Table 10 gives the results of emulsion tests carried out using the emulsion breaker and preventer NE-10. The tests were conducted in the following manner.

1) The acids to be tested were prepared with or without the non-emulsifier.
2) The acids and the oil were then mixed in a blender in equal volumes at high speed to create an emulsion.
3) The emulsion was quickly poured into a graduated cylinder and timing was commenced simultaneously.
4) The separation of oil and/or aqueous phases from the emulsion were observed at different time intervals and the results were recorded as percentage breakout.

should be used to maintain the pH of the solution and to hydrolyze any ammonium fluoride or bifluoride if it is used.

An example where other acids may be used besides the standard hydrochloric/hydrofluoric combination is where high temperatures are encountered and when it is difficult to protect the well casing from the corrosive effects of the hydrochloric acid. Here the organic acids, such as acetic and formic acids, can be used in place of the hydrochloric acid. Formulations containing 5%–10% by weight acetic acid and 1.5–3% by weight hydrofluoric acid were used to treat quartz with a mixture of HY and HV acids in a ratio of 1:2 by weight, respectively. The concentration of HY acid ranged between about 1–2% by weight with the amount of HV acid ranging between about 2–4% by weight. These formulations showed improved quartz solubility over conventional hydrochloric/hydrofluoric acid systems.

In treating most siliceous or sandstone formations, where possible, hydrochloric acid should be used as a preflush prior to the acid treatment. The concentration of the hydrochloric acid should be between 3–8% by weight of the preflush solution. Where high proportions of kaolinite and feldspar

TABLE 10*

| ACID SYSTEM | | 1 min.† | 2 min.† | 4 min.† | 6 min.† | 8 min.† | 10 min.† | 15 min.† | 30 min.† | Surface Tension Dyne/cm |
|---|---|---|---|---|---|---|---|---|---|---|
| 12:3 HCl:HF | W/O NE-10 | 0 | 0 | 0 | 0 | 0 | 0 | 0 | 0 | 65 |
| 12:3 HCl:HF | 2 GPT NE-10 | 53 | 55 | 55 | 57 | 57 | 59 | 62 | 81 | 36 |
| Clay acid | W/O NE-10 | 13 | 13 | 14 | 14 | 16 | 16 | 20 | 69 | 37 |
| Clay acid | 2 GPT NE-10 | 69 | 72 | 74 | 75 | 77 | 79 | 83 | 90 | 33 |
| RMS acid | W/O NE-10 | 55 | 56 | 57 | 60 | 63 | 65 | 67 | 79 | 67 |
| RMS acid | 2 GPT NE-10 | 59 | 63 | 64 | 65 | 67 | 67 | 69 | 85 | 33 |
| 12:3 + 12 GPT HY‡ | W/O NE-10 | 32 | 35 | 37 | 38 | 40 | 41 | 49 | 59 | 48 |
| 12:3 + 12 GPT HY‡ | 2 GPT NE-10 | 47 | 49 | 53 | 58 | 62 | 64 | 75 | 90 | 33 |

*GPT indicates gal/1000 gal.
† Percentage breakout measured as the volume broken out per total volume used to make the emulsion multiplied by 100%.
‡ HY acid at 50% strength.

From Table 10 it is seen that better results are achieved with HY acid than when using conventional hydrochloric/hydrofluoric acid systems and that HY acid is equivalent to other retarded acid systems.

Depending on the particular application, other mineral and organic acids or mixtures thereof can also be used with the phosphonate compounds with or without hydrofluoric acid. These acids include hydrochloric, chloroacetic, sulfuric, sulfamic, nitric, acetic, lactic, fumaric and formic acid. Final concentrations may vary but will typically range between 0.5 to 30% by weight of the solution. Enough acid are present, i.e. greater than 20%, the use of HY acid is recommended in the preflush in an amount of about 0.2–0.6% by volume (0.2–0.8% by weight) of the preflush solution, with about 0.25% by volume (0.3% by weight) being preferred. The amount of preflush should be around 7 pore volumes for the first foot of formation.

The main phosphonate acid systems used in treating the formation may be formulated merely by adding the phosphonate compounds of the invention to standard hydrofluoric acid mixtures used in the treatment of sandstone. The optimal concentration of the phosphonate used should be determined based upon solubility tests performed on samples of the formation to be treated. The amount of phosphonate used could vary from about 0.1% by weight of the total solution up to as much as 15% by weight, depending on whether hydrochloric acid is also used. However, concentrations will normally be between about 0.3–2.0% by weight of the solution when using hydrochloric/hydrofluoric acid. Stronger hydrochloric/hydrofluoric acid mixtures can also be used with the phosphonate acid systems than was used previously with conventional acidizing treatments. Between 0.25–15% by weight of the hydrofluoric acid can be used in the phosphonate acid systems. However, the ratio of hydrochloric acid to hydrofluoric acid should be kept between 3:1 to 4:1 at these higher concentrations.

Once the phosphonate acid has been introduced into the formation, it is preferable not to flow the wells immediately after treatment. Better results are obtained with soaking times of between 1 and 6 hours. A hydrochloric or ammonium chloride afterflush may then be used. The afterflush should be between 7 to 15 pore volumes for the first foot of formation.

To illustrate the effectiveness of the phosphonate acid systems, core flow tests were conducted using various acid treatments. Due to equipment limitations, cores were not saturated using vacuum, but nitrogen was used to push the fluids, causing fluctuation in the liquids rate due to the presence of the gas. Field cores and Berea cores varying in length from 2 to 14 inches and from 1 to 2 inches in diameter were used having permeabilities ranging between 0.5 to 3 md. From all core flow tests carried out using phosphonate acids, the ones with 4 to 6 hours shut in time produced better results. Considering that clay solubility is limited in these acids, the permeability improvement could only be derived from slow dissolution of the quartz portion of the matrix. The normal volume of acid used in the core flow test was around 10 to 20 pore volumes. Compressive strength was measured in a few tests before and after acid flow to check the matrix integrity. An average reduction in the compressive strength of between 5 to 10% was observed. Table 11 shows results obtained in 5 core flow tests performed on 14 inch long Berea Sandstone cores of 2 inches in diameter of various acid systems.

There are several advantages to the acid systems of the invention. Because the acids retard the reaction of hydrofluoric acid with silicates, it is not necessary to hydrolyze ammonium bifluoride in order to slow down the reaction. Thus, liquid hydrofluoric acid can be used in preparing the main acid. The retarded reaction rate with the silicates also allows the hydrofluoric acid to react more readily with quartz or silica while leaving the cementitious or clay components of the formation intact so that the integrity of the formation is not compromised. The phosphonates also have the ability to maintain alumini and silicate complexes in suspension which would otherwise precipitate out and clog the pore spaces of the formation. The phosphonate acids of the invention also leave the formation water wet so that production is not adversely affected after being treated.

The phosphonate acid systems also have a variety of applications in addition to normal matrix acidizing. Although they are of particular use in sandstone formations, they could also be used in the acidizing of carbonate formations. They can be used for remedial workovers of oil and gas wells to remove sand deposits and keep silicates in suspension. The presence of the phosphonate compounds within the well also aid in reducing scale buildup. The phosphonate acids can be gelled using viscosifiers, such as xanthan gum, for either friction reduction or to gel the acid to improve acid diversion or distribution into the rock's matrix. It is also within the scope of the present invention to incorporate phosphonate acids into acid fracturing treatments, especially in low permeability (short frac) sandstone formations. In such applications the phosphonate acid systems would be injected into the well at a high enough pressure to form fractures or open existing fractures. Channels are formed by the dissolving of material within the fractured formation with the channels remaining open after the pressure is reduced.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is

TABLE 11*

| Pre Flush | Main Acid | After Flush | Overall Pre-Job Perm To Diesel | Overall Post-Job Perm to diesel | Last 2" Pre-Job Perm To Diesel | Last 2" Post-Job Perm To Diesel | Overall Flow Ratio | Last 2" Flow Ratio |
|---|---|---|---|---|---|---|---|---|
| 7.5% HCl | 7.5:1.5HCl:HF | 3% Am. Cl | 35.4 | 65.0 | 64 | 93 | 1.83 | 1.45 |
| 7.5% HCl | RHF ACID | 3% Am. Cl | 17.5 | 7.2 | 19.6 | 8.2 | 0.41 | 0.41 |
| 7.5% HCl | CLAY ACID | 3% Am. Cl | 30.5 | 30.4 | 26.5 | 22.6 | 1.0 | 0.85 |
| 7.5% HCl | 7.5:1.5 HCl:HF + 6 GPT HY | 3% Am. Cl | 42.0 | 144.0 | 17.9 | 25.22 | 3.42 | 1.46 |
| 7.5% HCl | 7.5:1.5 HCl:HF + 6 GPT HY | 3% Am. Cl | 5.5 | 8.8 | 7.0 | 7.0 | 1.60 | 1.0 |
| 7.5% HCl | 24:6 HCl:HF + 18 GPT HY | 3% Am. Cl | 8.8 | 58.0 | 7.0 | 84.0 | 6.60 | 12.0 |
| 7.5% HCl | 12:3 HCl:HF + 12 GPT HY no Claytrol | 3% Am. Cl | 33 | 61.5 | 36 | 55 | 1.86 | 1.52 |

*GPT indicates gal/1000 gals using 50% strength HY acid.

therefore contemplated that the appended claims will cover

We claim:

1. A method of treating a siliceous formation to increase the formation's permeability, comprising the steps of:

preparing a treatment solution containing an amount of a phosphonate compound and a compound capable of dissolving siliceous materials of the formation; and then contacting the siliceous formation with the solution so that siliceous materials within the formation are dissolved, the phosphonate compound adsorbing to non-silica materials of the formation so that the rate of reaction of the non-silica materials with said compound capable of dissolving siliceous materials is effectively reduced and silica materials of the formation are more readily dissolved, thereby increasing the formation's permeability.

2. The method of claim 1, wherein:

the phosphonate compound has the formula:

where R1, R2, and R3 are each selected from a group consisting of hydrogen, alkyl, aryl, phosphonates, phosphates, acyl, amine, hydroxy and carboxyl groups; and
R4 and R5 are each selected from a group consisting of hydrogen, sodium, potassium, ammonium and organic radicals.

3. The method of claim 1, wherein:

the phosphonate compound is selected from a group consisting of 1-hydroxethylidine-1,1-diphosphonic acid, diethylene triamine penta (methylene phosphonic acid), and aminotri (methylene phosphonic acid).

4. The method of claim 1, wherein:

the compound capable of dissolving siliceous materials is hydrofluoric acid.

5. The method of claim 4, wherein:

the hydrofluoric acid is provided by hydrolyzing a fluoride salt in the treatment solution.

6. The method of claim 1, wherein:

the amount of the phosphonate compound is between about 0.1–15% by weight of the total solution.

7. The method of claim 4, wherein:

the treatment solution further contains hydrochloric acid.

8. The method of claim 4, wherein:

the amount of hydrofluoric acid is between about 0.25–15% by weight of the treatment solution.

9. The method of claim 7, wherein:

the ratio of hydrochloric acid to hydrofluoric acid is between about 3:1–5:1 by weight.

10. The method of claim 1, further comprising the step of:

contacting the siliceous formation with a hydrochloric acid solution prior to contacting the formation with the treatment solution.

11. The method of claim 10, wherein:

the hydrochloric acid solution has a hydrochloric acid concentration of between about 3–8% by weight of the total hydrochloric acid solution.

12. The method of claim 10, wherein:

the hydrochloric acid solution also contains a phosphonic acid in an amount of between about 0.2–0.8% by weight of the hydrochloric acid solution.

13. The method of claim 1, wherein:

the treatment solution contains a one or two carbon organic acid.

14. The method of claim 1, wherein:

the treatment solution contains an acid selected from the group consisting of hydrochloric, chloroacetic, sulfuric, sulfamic, nitric, acetic, lactic, fumaric and formic acid.

15. A method of stimulating production in a siliceous subterranean formation of an oil or gas well comprising the steps of:

preparing a treatment solution containing an effective amount of a phosphonate compound capable of adsorbing to silicate materials of the formation and a source of hydrofluoric acid;

introducing the solution into the well; and contacting the formation with the treatment solution so that siliceous materials of the formation are dissolved, the phosphonate compound adsorbing to silicate materials of the formation so that the rate of reaction of the silicate materials with the hydrofluoric acid is effectively reduced and silica materials of the formation are more readily dissolved, thereby increasing the permeability of the formation.

16. The method of claim 15, wherein:

the phosphonate compound has the formula:

where R1, R2, and R3 are each selected from a group consisting of hydrogen, alkyl, aryl, phosphonates, phosphates, acyl, amine, hydroxy and carboxyl; and
R4 and R5 are each selected from a group consisting of hydrogen, sodium, potassium, ammonium and organic radicals.

17. The method of claim 15, wherein:

the phosphonate compound is selected from a group consisting of 1-hydroxethylidine-1,1-diphosphonic acid, diethylene triamine penta (methylene phosphonic acid), and aminotri (methylene phosphonic acid).

18. The method of claim 15, wherein:

the treatment solution is introduced into the well at high pressure to cause fractures within the formation.

19. The method of claim 15, wherein:

the hydrofluoric acid is provided by hydrolyzing a fluoride salt in the treatment solution.

20. The method of claim 15, wherein:

the amount of the phosphonate compound is between about 0.1–15% by weight of the total solution.

21. The method of claim 15, wherein:

the solution further contains hydrochloric acid.

22. The method of claim 15, wherein:

the amount of hydrofluoric acid is between about 0.25–15% by weight of the treatment solution.

23. The method of claim 21, wherein:

the ratio of hydrochloric acid to hydrofluoric acid is between about 3:1–5:1 by weight.

24. The method of claim 15, further comprising:

contacting the siliceous formation with a hydrochloric acid solution prior to contacting the formation with the treatment solution.

25. The method of claim 24, wherein:

the hydrochloric acid solution has a concentration of hydrochloric acid between about 3–8% by weight of the total hydrochloric acid solution.

26. The method of claim 24, wherein:

the hydrochloric acid solution also contains a phosphonic acid in an amount of between about 0.2–0.8% by weight of the hydrochloric acid.

27. A method of treating a siliceous formation of an oil or gas well at temperatures in excess of 150° F. to increase the production of oil or gas from the formation, the method comprising the steps of:

preparing an aqueous treatment solution containing about 0.1–15% by weight of the treatment solution of a phosphonate compound and about 0.25–15% by weight of the treatment solution of hydrofluoric acid;

introducing the treatment solution into the well; and contacting the siliceous formation with the treatment solution so that siliceous materials within the formation are dissolved, the phosphonate compound adsorbing to silicate materials of the formation so that the rate of reaction of the silicate materials with the hydrofluoric acid is effectively reduced and silica materials of the formation are more readily dissolved, thereby increasing the permeability of the formation.

28. The method of claim 27, wherein:

the phosphonate compound has the formula:

where R1, R2, and R3 are each selected from a group consisting of hydrogen, alkyl, aryl, phosphonates, phosphates, acyl, amine, hydroxy and carboxyl groups; and R4 and R5 are each selected from a group consisting of hydrogen, sodium, potassium, ammonium and organic radicals.

29. The method of claim 27, wherein:

the phosphonate compound is selected from a group consisting of 1-hydroxethylidine-1,1-diphosphonic acid, diethylene triamine penta (methylene phosphonic acid), and aminotri (methylene phosphonic acid).

30. The method of claim 27, wherein:

the treatment solution is introduced into the well at high pressure to cause fractures within the formation.

31. The method of claim 27, wherein:

the hydrofluoric acid is provided by hydrolyzing a fluoride salt in the treatment solution.

32. The method of claim 27, wherein:

the treatment solution further contains hydrochloric acid.

33. The method of claim 27, wherein:

the treatment solution further contains a one or two carbon organic acid.

34. The method of claim 27, wherein:

the treatment solution further contains an acid selected from the group consisting of hydrochloric, chloroacetic, sulfuric, sulfamic, nitric, acetic, lactic, fumaric and formic acid.

35. The method of claim 32, wherein:

the ratio of hydrochloric acid to hydrofluoric acid is between about 3:1–5:1 by weight.

36. The method of claim 27, further comprising:

contacting the siliceous formation with a hydrochloric acid solution prior to contacting the formation with the treatment solution.

37. The method of claim 36, wherein:

the hydrochloric acid solution has a hydrochloric acid concentration of between about 3–8% by weight of the total hydrochloric acid solution.

38. The method of claim 36, wherein:

the hydrochloric acid solution also contains a phosphonic acid in an amount of between about 0.2–0.8% by weight of the hydrochloric acid.

39. A composition for treating a siliceous formation to increase the permeability of the formation, the composition comprising:

a solution containing an effective amount of a phosphonate compound and hydrofluoric acid, the phosphonate compound being capable of adsorbing to silicate materials of the formation so that the rate of reaction of the silicate materials with the hydrofluoric acid is effectively reduced to allow silica material of the formation to be more readily dissolved, thereby increasing the permeability of the formation.

40. A method of treating a siliceous formation to increase the formation's permeability, comprising the steps of:

preparing a treatment solution containing an amount of a phosphonate compound and a compound capable of dissolving siliceous materials of the formation; and then contacting the siliceous formation with the solution so that siliceous materials within the formation are dissolved, thereby increasing the formation's permeability; and wherein the phosphonate compound is selected from a group consisting of 1-hydroxethylidine-1,1-diphosphonic acid, diethylene triamine penta (methylene phosphonic acid), and aminotri (methylene phosphonic acid).

41. A method of treating a siliceous formation to increase the formation's permeability, comprising the steps of:

preparing a treatment solution containing an amount of a phosphonate compound, hydrofluoric acid and hydrochloric acid; and then contacting the siliceous formation with the solution so that siliceous materials within the formation are dissolved, thereby increasing the formation's permeability.

42. The method of claim 41, wherein:

the ratio of hydrochloric acid to hydrofluoric acid is between about 3:1–5:1 by weight.

* * * * *

UNITED STATES PATENT AND TRADEMARK OFFICE
CERTIFICATE OF CORRECTION

PATENT NO.   : 5,529,125
DATED        : June 25, 1996
INVENTOR(S)  : Gino F. Di Lullo Arias and Atikah J. Ahmad It is certified that error appears in the above-identified patent and that said Letters Patent is hereby corrected as shown below:

column 1, line 8, delete "s" in the word Inventions.

column 1, line 11, delete "s" in the word Arts.

column 3, line 50 add --<-- before 4.5.

column 6, line 60, delete "54" and add --65--.

column 8, line 55, delete "SiO2" and add --$SiO_2$--.

column 9, line 37, delete "$RPO_3H_2$" and add --$R-PO_3H_2$--.

column 10, line 55, delete "Corrision" and add --Corrosion--.

Signed and Sealed this

Twenty-ninth Day of July, 1997

Attest:

BRUCE LEHMAN

*Attesting Officer*    *Commissioner of Patents and Trademarks*